(12) United States Patent
Chu et al.

(10) Patent No.: US 8,534,876 B2
(45) Date of Patent: Sep. 17, 2013

(54) ULTRA-LOW PROFILE OPTICAL FINGER NAVIGATION ILLUMINATION SYSTEM THROUGH SEGMENTATION

(75) Inventors: Lye Pin Chu, Kuala Lumepur (MY); Sai Mun Lee, Penang (MY)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 185 days.

(21) Appl. No.: 13/024,655

(22) Filed: Feb. 10, 2011

(65) Prior Publication Data

US 2012/0206919 A1    Aug. 16, 2012

(51) Int. Cl.
*F21V 7/00*    (2006.01)

(52) U.S. Cl.
USPC ........... 362/297; 362/253; 362/257; 362/268; 362/296.01; 362/298; 362/346; 345/173; 345/175

(58) Field of Classification Search
USPC ................... 362/253, 257, 268, 296.01, 297, 362/298, 346; 345/156, 158, 173, 175; 348/370
See application file for complete search history.

(56) References Cited

U.S. PATENT DOCUMENTS

| | | | |
|---|---|---|---|
| 6,969,176 | B2 | 11/2005 | Pohle |
| 7,244,925 | B2 | 7/2007 | Xie |
| 7,855,843 | B2 | 12/2010 | Smith |
| 2004/0208348 | A1 | 10/2004 | Baharav et al. |
| 2005/0243055 | A1 | 11/2005 | Ranta et al. |
| 2006/0158751 | A1 | 7/2006 | McClurg et al. |
| 2007/0291164 | A1 | 12/2007 | Goh et al. |
| 2009/0201594 | A1 | 8/2009 | Smith |
| 2010/0079408 | A1 | 4/2010 | Leong et al. |
| 2010/0214224 | A1 | 8/2010 | Dolfi |
| 2010/0289775 | A1 | 11/2010 | Lee et al. |
| 2010/0302208 | A1 | 12/2010 | Brosnan et al. |
| 2010/0322550 | A1 | 12/2010 | Trott |
| 2012/0098792 | A1 | 4/2012 | Lum et al. |
| 2012/0105325 | A1 | 5/2012 | Brosnan et al. |
| 2012/0181419 | A1 | 7/2012 | Momtahan |

OTHER PUBLICATIONS

Lee et al., U.S. Appl. No. 13/009,669, Entitled "Non-Planar Reflective Folded Optics", filed Jan. 19, 2011 20 pages.

*Primary Examiner* — Stephen F Husar
*Assistant Examiner* — Meghan Dunwiddie

(57) ABSTRACT

An optical sensor assembly is disclosed. The optical sensor assembly includes an illumination system that segments light emitted by a light source into multiple segments. The multiple segments are allowed to travel different optical paths on their way to a common target area and are further allowed to irradiate different portions of the common target area. This enables a low-profile optical sensor assembly to be achieved.

18 Claims, 5 Drawing Sheets

ULTRA-LOW PROFILE OPTICAL FINGER NAVIGATION ILLUMINATION SYSTEM THROUGH SEGMENTATION

FIELD OF THE DISCLOSURE

The present disclosure is generally directed toward optics and more specifically toward optical navigation devices.

BACKGROUND

Some electronic devices, such as cellular phones and smart phones, have menus or graphical user interfaces that are rather complex. In order to navigate through these menus, a user may move his finger over a navigator, which causes an icon associated with the menus to move. As electronic devices get smaller, the navigators must also get smaller so as not to limit the size of the electronic devices.

An Optical Finger Navigation (OFN) system is often incorporated into such electronic devices. An OFN system traditionally includes an illumination system which lights up a target area and an optical imaging system which receives images of a user's finger as it interfaces with the target area. The images received at the optical imaging system can then be converted into electrical signals which are used to manipulate objects displayed by the electronic device.

The illumination system has several parameters that can be altered to achieve superior finger tracking performance. The first parameter is the area of the beam spot which illuminates the target area—the larger the beam spot the more image data that is potentially available to the sensor in the imaging system. The second parameter is the amount of angular spread of light rays incident on the object that is proximate to the target area—a more accurate tracking performance can be achieved when the amount of angular spread is minimized. The third parameter is the amount of optical power (irradiance) that falls onto the target area—better images and more accurate tracking can be achieved if there is sufficient irradiance falling onto the target area.

One existing solution for manipulating and maximizing these illumination system parameters to achieve quality tracking performance utilizes light pipes that collect, expand, and direct (collimate) light from a bare LED die onto the target area.

Another existing solution for manipulating and maximizing these illumination system parameters to achieve quality tracking performance utilizes a packaged LED (usually with an integrated collection of optics such as reflector cups and domes) and then redirects light emitted by the packaged LED onto the target area via mirrors, light pipes, and the like.

The main drawback to both of the above-described existing solutions is that they require valuable space to achieve quality tracking performance. In particular, both of these solutions typically require a vertical space (thickness) in the region of about 2 mm to about 4 mm. As there is a need for smaller electronic devices and smaller OFN systems, there is also a need to rethink the existing illumination systems used in OFN systems.

BRIEF DESCRIPTION OF THE DRAWINGS

The present disclosure is described in conjunction with the appended figures.

DETAILED DESCRIPTION

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims.

Figure 1:
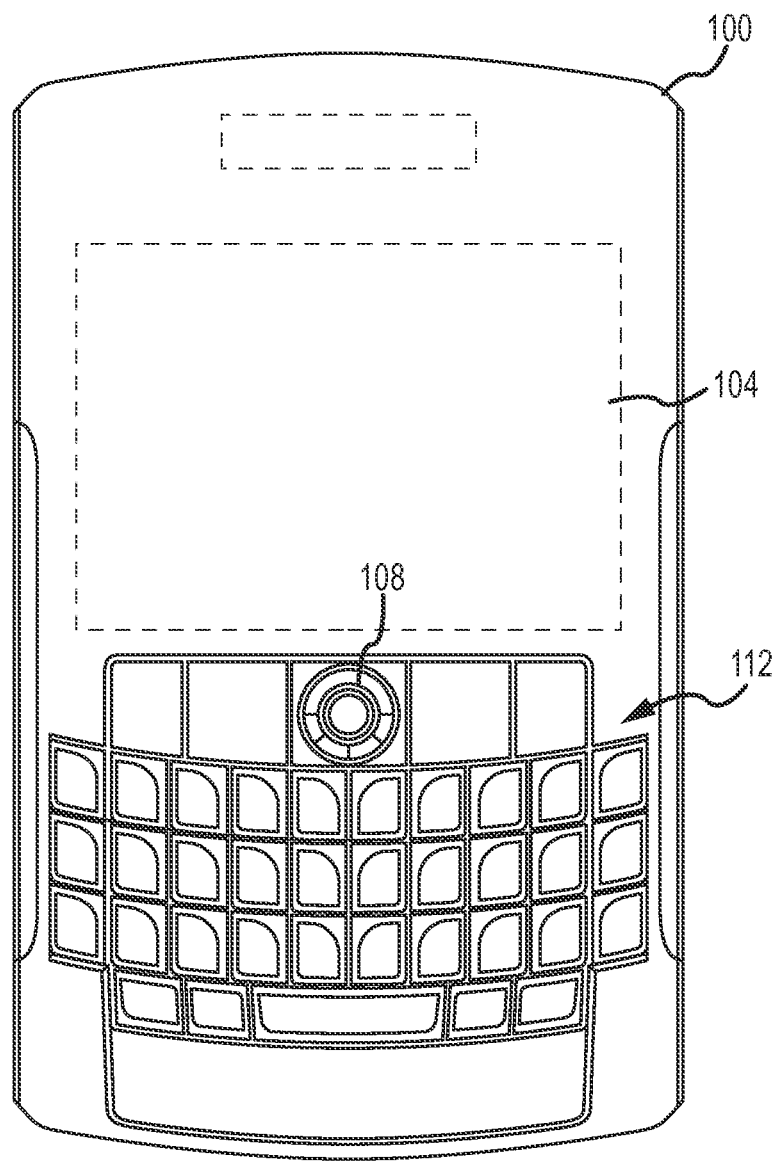
FIG. 1 is a front view of a user device in accordance with embodiments of the present disclosure.

FIG. 1 shows an illustrative embodiment of a user device 100. The user device 100 may include a display screen 104, a touch input 108, and a keypad input 112. The display screen 104, touch input 108, and keypad input 112 may be collectively referred to as the user interface of the user device 100. The user interface of the user device 100 may comprise other components such as a microphone (for receiving audio user input), a speaker (for providing audio user output), a camera (for capturing image input), and buttons in addition to the keypad for controlling various other operations of the user device 100.

In some embodiments, the display screen 104 is purely a user output, meaning that the display screen 104 is not configured to receive user input. In some embodiments, the display screen 104 may comprise a touch-pad or similar dual user input/output device. In such embodiments, the touch input 108, or components thereof, may be incorporated into the user output 104 by virtue of the fact that the display screen 104 is also configured to detect user input in the form of touch and/or image data and convert the touch or image data to an electrical signal for processing by the user device 100. If the display screen 104 is configured as a touch-screen input, then it may not be necessary to provide the user device 100 with a separate touch input 108.

The touch input 108 may comprise an input device which can be manipulated by a user's finger, thumb, and/or hand. Alternatively, or in addition, the touch input 108 may be manipulated by a stylus or the like. In some embodiments, the touch input 108 is an optical-based user input that comprises an optical sensor assembly. A user can employ the touch input 108 to move an object, cursor, selection tool, pointer, or the like on the display screen 104. Thus, the touch input 108 provides one option for the user to interface with the user device 100. In some embodiments, a user's finger engages the touch input 108 and the x-y motion of the user's finger across the touch input 108 is converted to x-y input data. The x-y input data may be used to manipulate the object, cursor, selection tool, pointer, or the like around the display screen 104.

The keypad 112 provides another mechanism for receiving user input at the user device 100. The keypad 112 may correspond to any button or collection of buttons provided in any type of configuration. For example, the keypad 112 may correspond to a QWERTY keyboard, a derivative thereof, or alternatives for the same (e.g., a mobile version of a QWERTY keyboard, an alphabetic keyboard, or any keyboard used for a specific language). As another example, the keypad 112 may be configured as a dial-pad having buttons corresponding to 0-9 digits, a "#" key, and a "*" key. As another example, the keypad 112 may comprise a calculator input with buttons corresponding to 0-9 digits and one or more keys for performing mathematical operations. Combinations of the above-described keypad 112 configurations may also be implemented in accordance with embodiments of the present disclosure.

In some embodiments, the user device 100 corresponds to a mobile communication device; in particular, the user device 100 may correspond to a cellular phone, mobile phone, smart phone, or the like. Other types of suitable user devices 100 include, but are not limited to, computers, laptops, netbooks, telephones, typewriters with an electronic communication channel (e.g., Text Telephone (TTY)), or the like.

Figure 2A:
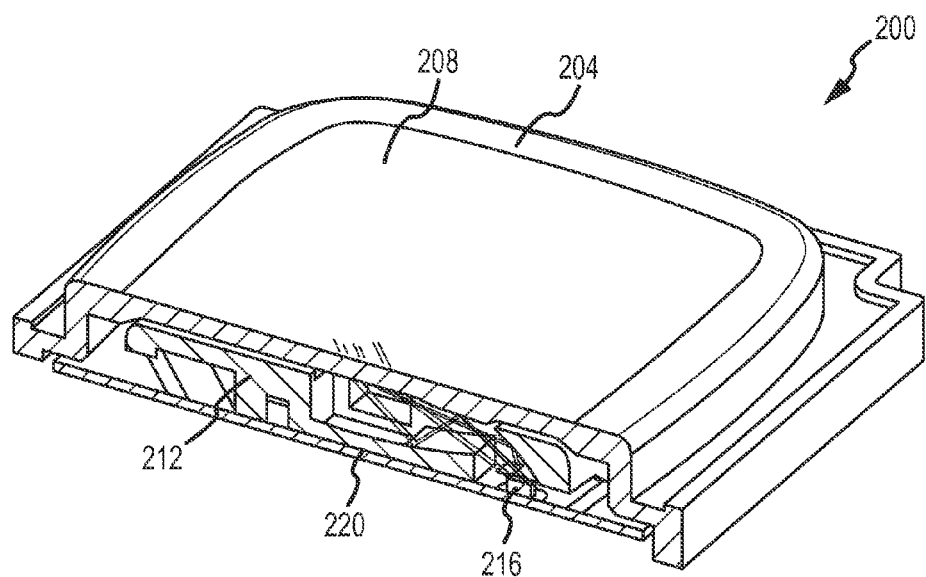
FIG. 2A is a cross-sectional perspective view of an optical sensor assembly in accordance with embodiments of the present disclosure.
Figure 2B:
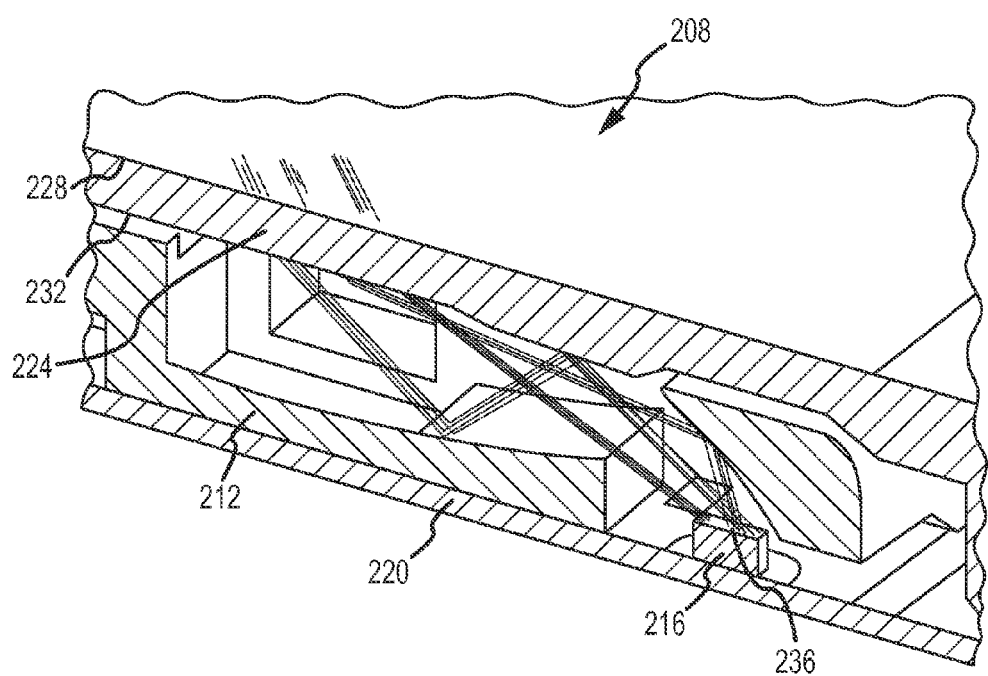
FIG. 2B is a magnification of the perspective view depicted in FIG. 2A.

Referring now to FIGS. 2A and 2B some components of an optical sensor assembly 200 which may be included in the touch input 108 will be described in accordance with embodiments of the present disclosure. The optical sensor assembly 200 may comprise a number of components including, without limitation, a cover 204, a bracket 212, a light source 216, and a mounting substrate 220. It should be appreciated that two or more of the individual components of the sensor assembly 200 may be combined into a single component without departing from the scope of the present disclosure.

The cover 204 may comprise a user interaction area 208, which provides a surface for a user of the user device 100 to interact with the optical sensor assembly 200. The cover 204 may comprise an elevated portion 224 that serves the dual purpose of providing the user interaction area 208 on its top major surface 228 as well as establishing a cavity which houses the other components of the optical sensor assembly 200. In particular, the elevated portion 224 may have its top major surface 228 which at least partially includes the user interaction area 208 whereas a bottom major surface 232 of the elevated portion 224 faces the internal components of the optical sensor assembly 200. In some embodiments, the top major surface 228 opposes the bottom major surface 232.

In some embodiments, the user interaction area 208 comprises a window formed of plastic and/or glass which physically connects the top major surface 228 to the bottom major surface 232. The material used for the user interaction area 208 should be configured to allow at least some light generated by the light source 216 contained within the cavity of the cover 204 to pass from the bottom major surface 232 to the top major surface 228. The material chosen for the user interaction area 208 of the cover 204 should be sufficiently strong and resistant to deformation under normal pressure applied by a user at the top major surface 228 as well as at least partially transmissive. Particularly, the user interaction area 208 may be configured to allow light emitted from the light source 216 to reach the top major surface 228 as well as allow light that is reflected off an object proximate top major surface 228 to re-enter the cover 204.

It should be appreciated that the term "light" can encompass light that is in the visible and/or invisible spectrum. Additionally, the light may be coherent (i.e., laser light) or incoherent without departing from the scope of the present disclosure.

The light source 216 and bracket 212 may be mounted on the substrate 220 within the cavity of the cover 204. In some embodiments, the substrate 220 corresponds to a Printed Circuit Board (PCB) or flexchip that both provides a mounting surface for the light source 216 as well as a mechanism for providing electrical current to the light source 216 to energize the light source 216. In some embodiments, the substrate 220 simply corresponds to a piece of plastic and/or metal that provides a structural support for the light source 216 and bracket 212. The substrate 220 may also be configured to have the light source 216 and bracket 212 mounted relative to one another in a particular fixed orientation that facilitates the segmentation of light generated by the light source 216 as it travels to the user interaction area 208.

In some embodiments, the light source 216 corresponds to a bare LED that is mounted to the substrate 220. The bare LED may be configured to emit incoherent light from a top light-emitting surface 236. It may also be possible to utilize a side-emitting LED alone or in combination with an LED configured to emit light from a top light-emitting surface 236. By providing a bare LED as the light source 216, the overall thickness of the optical sensor assembly 200 can be greatly reduced as compared to optical sensor assemblies of the prior art which utilize packaged LEDs that are contained within a larger LED having optical elements incorporated therein. The bare LED light source 216 does not require any optical components to focus or direct light emitted by the top light-emitting surface 236.

Although embodiments of the present disclosure are depicted and described as utilizing traditional light sources 216, one of ordinary skill in the art will appreciate that embodiments of the present disclosure may be practiced with any type of light source 216 including any type of miniaturized LED package that provides for a first level of light manipulation without requiring a substantial amount of vertical space. For example, if a packaged LED becomes available that can be used within the vertical space requirements discussed herein, such a packaged LED would be a suitable light source 216.

Instead, the bracket 212 and/or bottom major surface 224 of the cover 204 may be configured with one or more optical elements which direct the light toward the user interaction area 208. In some embodiments, the optical elements included in the bracket 212 and/or cover 204 may simply comprise reflective surfaces which are strategically positioned to segment light emitted by the light source 216 into multiple segments, and cause each of the multiple segments to travel a different optical path on their way to the user interaction area 208. Alternatively, or in addition, the optical elements included in the bracket 212 and/or cover 204 may comprise one or more of a prism, mirror, lens, or combinations thereof. In some embodiments, the bracket 212 corresponds to a single piece of plastic that has been formed by machining, injection molding, or a similar process. The cover 204 may also be formed by a similar manufacturing process. The optical elements incorporated into the bracket 212 and/or cover 204 may be realized by applying a reflective coating to portions of those components. In some embodiments, the reflective coating may be applied using any type of deposition process.

The optical sensor assembly 200 advantageously avoids the need to utilize light pipes to control light as it travels from the light source 216 to the user interaction area 208. By avoiding the need for light pipes, embodiments of the present disclosure achieve an optical sensor assembly 200 with an extremely low profile.

In embodiments where a bare LED light source 216 is used in combination with the bracket 212 and/or cover 204 that do not require the use of light pipes, the overall thickness (i.e., vertical height as measured from the top major surface 228 to the bottom surface of the substrate 220) of the optical sensor assembly 200 can be kept to about 1 mm as compared to optical sensor assemblies of the prior art which could not achieve a thickness of any less than about 2.5 mm. However, the strategic positioning of optical elements in the bracket 212 and/or cover 204 still enable a high quality beam spot size and beam uniformity to be achieved at the user interaction surface 208.

The various components of the optical sensor assembly 200 may be manufactured using any number of known manufacturing techniques. As one example, some or all of the components may be machined from a single piece of material. As another example, some or all of the components may be formed by an injection molding process. As yet another example, some or all of the components may comprise multiple pieces that are connected to one another using adhesives, external connection members, press-fit features, or the like. Combinations of the above manufacturing techniques may also be used to manufacture the various components of the optical sensor assembly 200. In some embodiments, the bracket 212 may be formed with an injection molding process whereas the cover 204 may be constructed of multiple parts (e.g., some portions of the cover 204 may be manufactured using injection molding whereas other portions like the window of the cover 204 may be separately manufactured and connected to the injection molded part of the cover 204). Any other suitable manufacturing technique can be employed without departing from the scope of the present disclosure.

Although not depicted, the optical sensor assembly 200 may also comprise an optical sensor that is mounted to the substrate 220. In some embodiments, the optical sensor may comprise a photodiode, a plurality of photodiodes, an array of photodiodes, or the like. The light source 216 may be configured to transmit light up through the cover 204 to the top major surface 228 where it can be reflected off an object (e.g., finger, hand, stylus, etc.) located in the user interaction area 208. The reflected light may then travel back through the cover 204, through the bracket 212 until it eventually reaches the optical sensor. The light received at the sensor 216 can be converted into an electrical signal and processed to determine motion of the object that interfaced with the top major surface 228 of the cover 204. The determined motion of the object can then be converted into an x-y motion input or some other computer command to control one or more objects on the display screen 104 of the user device 100.

Additional details of an imaging system which includes an optical sensor are described in U.S. patent application Ser. No. 13/009,669 to Lee et al., the entire contents of which are hereby incorporated herein by reference in their entirety.

Figure 3A:
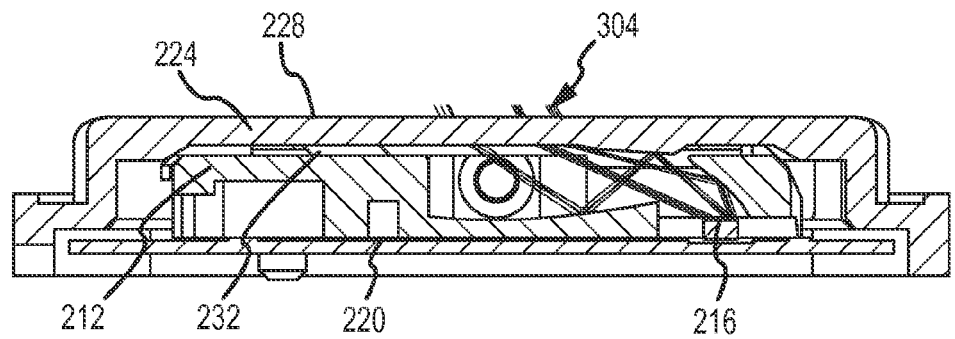
FIG. 3A is a cross-sectional elevational view of components in an optical sensor assembly in accordance with embodiments of the present disclosure.
Figure 3B:
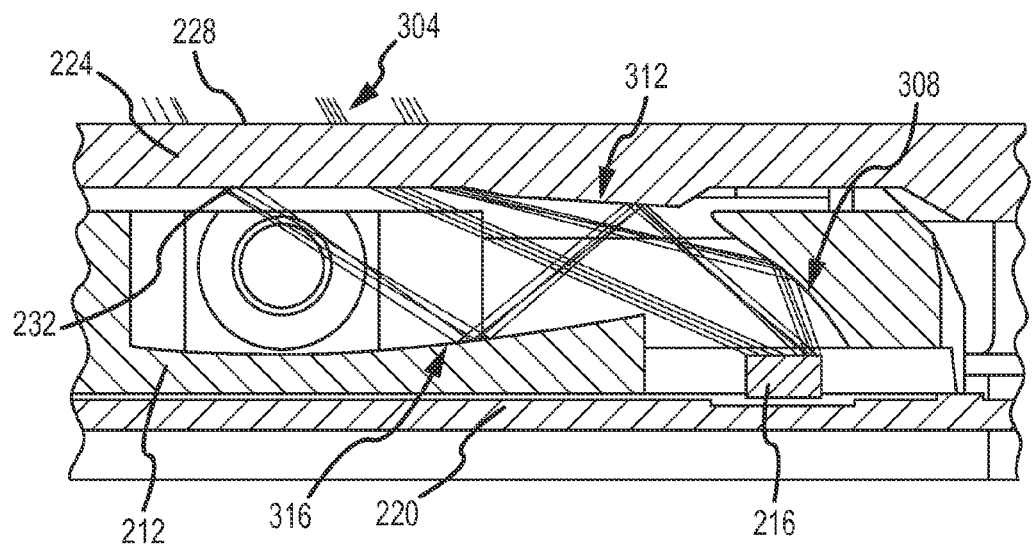
FIG. 3B is a magnification of the elevational view depicted in FIG. 3A.

FIGS. 3A and 3B depict further details of the optical elements which may be included in the bracket 212 and/or cover 204 to achieve a sufficiently sized and uniform light beam at the top major surface 228. In particular, the light emitted by the light source 216 may be directed toward a target area 304. The size of the target area 304 may be smaller than the area of the entire user interaction area 208. However, the size of the target area 304 may be larger than an average area of a user's finger when pressed against the top major surface 228. For example, the target area 304 may be configured to have an area of between approximately 1 mm and 2 mm.

In some embodiments, a plurality of optical elements including a first optical element 308, a second optical element 312, and a third optical element 316 are established within the cavity of the cover 204. In some embodiments, some of the optical elements 308, 312, 316 are established in the bracket 212 whereas others of the optical elements are established in the cover 204. It may be possible, however, to have all optical elements be established either in the bracket 212 or in the cover 204. It may also be possible to provide additional components to the optical sensor assembly 200 which have one or more of the optical elements 308, 312, 316 incorporated therein.

Each of the optical elements may be used to redirect at least some portions of light emitted by the light source 216. The optical elements 308, 312, 316 may also be positioned relative to one another such that light emitted by the light source 216 is separated into two, three, four, five, or more different segments and each of the different segments travel to the target area 304 via a different optical path.

In some embodiments, the optical elements 308, 312, and/or 316 used to direct light from the light source 216 to the target area 304 may be an integral part of the bracket 212 and/or cover 204. In other words, the bracket 212 and/or cover 204 may be formed in such a way that they include the optical elements 308, 312, 316. In embodiments where the bracket 212 is formed of a plastic material, it may be desirable to cover portions of the bracket 212 with a reflective material. Likewise, where the elevated portion 224 is constructed of plastic, portions of the elevated portion 224 may be coated with a reflective material. In some embodiments, a reflective metal, metal alloy, or similarly reflective material may be deposited on selected areas of the bracket 212 and/or cover 204 to create the optical elements 308, 312, and/or 316. Examples of suitable materials which may be added to the bracket 212 and/or cover 204 to create the optical elements 308, 312, and/or 316 include, without limitation, Al, Au, Ag, Ni, W, Pi, and/or Pt. The reflective material may be deposited on the bracket 212 and/or cover 204 using electroless or electro-plating techniques.

In the non-limiting embodiments depicted and described herein, the first and third optical elements 308 and 316, respectively, may be integral to the bracket 212 whereas the second optical element 312 is integral to the cover 204. More specifically, the first optical element 308 may be configured to redirect light that has been emitted in a generally upward direction by the light source 216 substantially transverse or orthogonal to its original direction of travel. Additionally, light that is redirected by the first optical element 308 may travel though the cavity of the cover 204 to the target area 304 and bypass the second and third optical elements 312 and 316. The second optical element 312 may be configured to redirect light emitted from the light source 216 in a generally downward direct toward the third optical element 316. In some embodiments, the second optical element 312 is configured as a thicker and slanted section of the elevated portion 224. The third optical element 316 may then be configured to redirect light received from the second optical element 312 back in a generally upward direction toward the target area 304.

Furthermore, the optical elements 308, 312, 316 may be spaced apart from one another to allow at least some light emitted by the light source 216 to bypass the optical elements 308, 312, and 316 and travel directly to the target area 304 (albeit through the material of the elevated portion 224 which may act as an optical element which refracts light traveling from the bottom major surface 232 to the top major surface 228).

In some embodiments, the distance that light travels in the x-direction (i.e., parallel to the top major surface 228 and in the plane of the paper) from the light source 216 to the target area 304 may be greater than the distance that light travels in the z-direction (i.e., perpendicular to the top major surface 228 and in the plane of the paper). In some embodiments, light traveling from the light source 216 to the target area 304 may travel approximately 2 to 3 times further in the x-direction as compared to the z-direction. This helps to minimize the thickness of the optical sensor assembly 200 in the z-direction, thereby increasing its desirability. As one non-limiting example, the distance in the x-direction between the light source 216 and the target area 304 may be in the range of approximately 2 mm to 3 mm, whereas the distance in the z-direction between the light source 216 and the target area 304 may be approximately 1 mm. It should be appreciated, however, that different distances and relative orientations between the light source 216 and target area 304 can be accommodated based on various design constraints.

It should be appreciated that the characteristics of the optical elements 308, 312, and/or 316 can be altered to achieve any type of light segmentation. Moreover, a greater or lesser number of optical elements used for segmenting the light emitted by the light source 216 can be used without departing from the scope of the present disclosure. As one example, the material used for the elevated portion 224 may be configured to bend or refract light as it passes therethrough. Thus, the elevated portion 224 may be considered an optical element itself. As another example, the first and third optical elements 308 and 316 are depicted as having at least some curvature whereas the second optical element 312 is depicted as being a substantially planar reflective surface. One of ordinary skill in the art will appreciate that any combination of curved, planar, folded, or bent features may be utilized to construct the optical elements 308, 312, and/or 316. As a non-limiting example, instead of using a curved reflective surface for the first optical element 308, a series of planar segments having a generally curved or angular relationship relative to one another may be used instead of using a truly curved reflective surface. As noted above, any combination of prisms, mirrors, lenses, and other known optical elements may be used to achieve the desired optical characteristics described herein.

Figure 4:
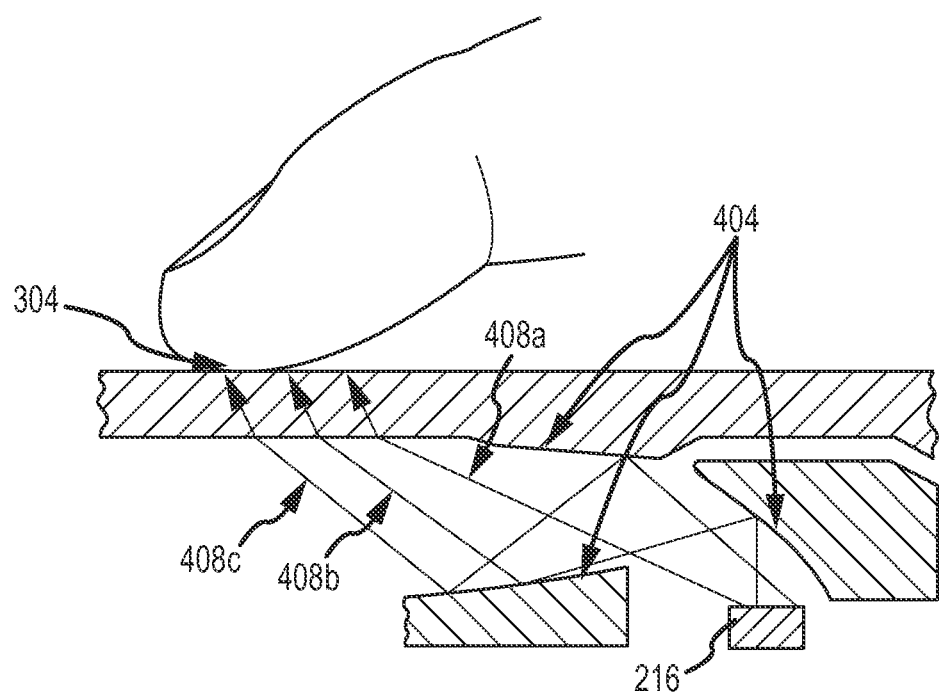
FIG. 4 is a cross-sectional component view of an illumination system in accordance with embodiments of the present disclosure.

With reference now to FIG. 4, further details of segmenting light emitted by the light source 216 will be described in accordance with at least some embodiments of the present disclosure. FIG. 4 shows a simplified version of the light source 216, the target area 304, and the light segmenting optics 404 which are provided to segment the light as it travels from the light source 216 to the target area 304. In some embodiments, the light segmenting optics 404 are similar or identical to the optical elements 308, 312, and 316. However, the light segmenting optics 404 have been individually depicted to emphasize that the optical elements 308, 312, 316 can be established in any component of the optical sensor assembly 200 or they may be established as stand-alone components of the optical sensor assembly 200. Additionally, FIG. 4 shows a simplified diagram of the multiple light segments 408*a*, 408*b*, and 408*c* traveling from the light source 216 to the target area 304.

In some embodiments, the number of segments into which the light emitted by the light source 216 is separated is equal to the number of optical elements in the light segmenting optics 404. In the depicted embodiment, the first light segment 408*a* passes through the light segmenting optics 404 without being redirected and arrives at the bottom major surface 232, where it is refracted toward the target area 304.

The second light segment 408*b* encounters one or more elements in the light segmenting optics 404 before arriving at the bottom major surface 232. Although FIG. 4 shows the second light segment 408*b* as reflecting off two elements in the light segmenting optics 404, it may also be possible that the second light segment 408*b* only encounters one element in the light segmenting optics 404 before arriving at the bottom major surface 232 and the manner in which the second light segment 408*b* is redirected does not necessarily have to correspond to a reflection or series of reflections but rather may correspond to a refraction, a series of refractions, or a combination of refractions and reflections.

Similar to the second light segment 408*b*, the third light segment 408*c* may encounter one or more elements in the light segmenting optics 404 before arriving at the bottom major surface 232. However, the third light segment 408*c* travels a different optical path than the second light segment 408*b*, which means that the third light segment 408*c* encountered at least one different element in the light segmenting optics 404 than did the first and second light segments 408*a* and 408*b*, respectively.

In accordance with at least some embodiments of the present disclosure, a different light segment is defined by the fact that it encounters at least one element in the light segmenting optics 404 that at least one other light segment did not encounter as both light segments traveled from the light source 216 to the target area 304 (or area on the bottom major surface 232 corresponding to the target area 304), except for the light segment which did not encounter any element in the light segmenting optics 404.

Because the different light segments 408*a*, 408*b*, 408*c* each traveled a different optical path and encountered different elements in the light segmenting optics 404, if at all, the different light segments 408*a*, 408*b*, 408*c* each arrive at a different part of the target area 304. More specifically, each light segment 408*a*, 408*b*, 408*c* has a different irradiance profile at the target area 304, but the summation or combination of the different irradiance profiles from each light segment 408*a*, 408*b*, 408*c* results in a complete irradiance of the target area 304. Also, the light segmenting optics 404 are configured to ensure that the different light segments 408*a*, 408*b*, 408*c* arrive at the target area 304 at approximately the same angle of incidence or within a tolerable range. While it is true that the angles of incidence at the target area 304 and/or bottom major surface 232 from one light segment to the next is not exactly the same, the light segmenting optics 404 are configured to ensure that the difference in the angles of incidence is small enough that excellent object tracking performance at the target area 304 can still be achieved.

Accordingly, light emitted by the light source 216 is segmented by the light segmenting optics 404. Each segment 408*a*, 408*b*, 408*c* travels a different optical path between the light source 216 and target area 304. In some embodiments, a first light segment 408*a* may travel directly from the light source to the target area 304, thereby resulting in a direct illumination of the target area 304 by the first light segment 408*a*. The other light segments may be reflected and/or refracted by the light segmenting optics 404 before arriving at the target area 304.

The division of light output from the light source 216 into segments of beam spots allows better control of the light output within the confined vertical space defined by the height of the elevated portion 224. This segmented approach also improves the efficiency of the optical sensor assembly 200 as a larger proportion of light emitted by the light source 216 is captured and redirected to the target area 304.

The combined effect of each light segment 408*a*, 408*b*, 408*c* is a large and relatively uniform beam spot at the target area 304. The beam spot may be circular, elliptical, square, or rectangular in shape. The beam spot is also achieved within a vertical height of less than about 2 mm. Stated another way, embodiments of the present disclosure enable a mechanism for manipulating or conditioning the light beam spot at the target area 304 within tight vertical space constraints.

Figure 5:
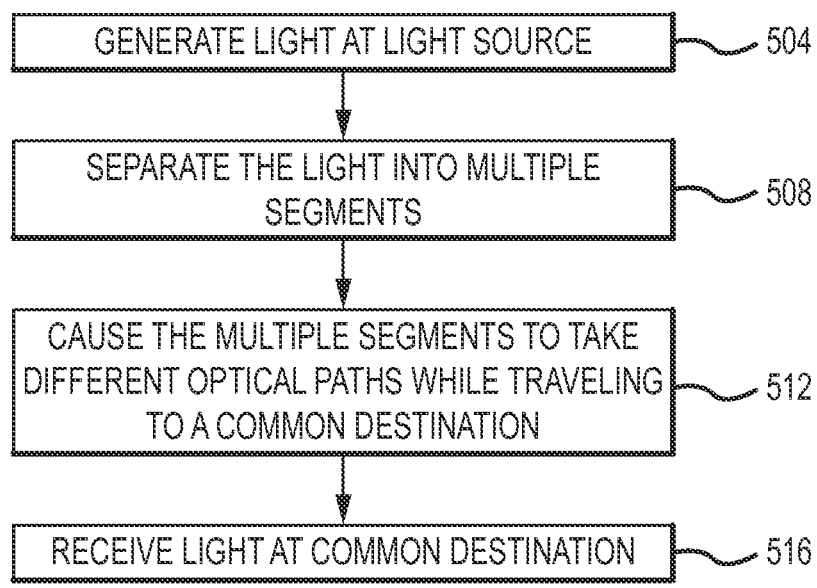
FIG. 5 is a flow diagram depicting a method of operating an optical sensor assembly in accordance with embodiments of the present disclosure.

With reference now to FIG. 5, a method of using an optical sensor assembly 200 with the user device 100 will be described in accordance with at least some embodiments of the present disclosure. The method is initiated when light is generated at the light source 216 and emitted from a light-emitting surface of the light source 216 (step 504). The light may be emitted by an LED (bare or packaged), a plurality of LEDs (bare or packaged) not in an array, or an array of LEDs (bare or packaged) which are housed within the cover 204.

The light emitted by the light source 216 is then separated into multiple segments (step 508) and the separate segments are directed along different optical paths while traveling to their common destination (step 512). In some embodiments, the light segmenting optics 404 are used to segment the light emitted by the light source 216. Also, an optical path of a particular light segment is defined by the light-directing elements which that particular light segment encounters. Thus, different light segments will be defined by the optical elements which are encountered by the light segments. As an example, one light segment may travel the optical path of light source 216-optical element A-optical element B-optical element C-common destination. A second light segment may travel the optical path of light source 216-optical element B-optical element D-common destination. A third light segment may travel the optical path of light source 216-optical element C-common destination. A fourth light segment may travel the optical path of light source 216-common destination.

Accordingly, the method continues when the different light segments are received at the common destination, which may correspond to the target area 304 or an area on the bottom major surface 232 that corresponds to the target area 304 (step 516). Although not depicted, additional steps of operating the optical sensor assembly 200 may include receiving light reflected by an object near the common destination, converting that light into an electrical signal, and then using that electrical signal to control an operation of the user device 100.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. An illumination system for use with an Optical Finger Navigation (OFN) system, the illumination system comprising:
    a light source; and
    light segmenting optics positioned between the light source and a target area, the light segmenting optics comprising one or more optical elements configured to segment light emitted by the light source into at least a first light segment and a second light segment such that the first light segment travels a first optical path from the light source to the target area and the second light segment travels a second optical path from the light source to the target area, wherein the first and second optical paths are different, and wherein the first light segment encounters at least one optical element in the light segmenting optics that the second light segment does not encounter, wherein both the first and second light segments arrive at the target area at substantially the same angle of incidence.

2. The system of claim 1, wherein the second light segment does not encounter any optical elements in the light segmenting optics and wherein the first light segment is reflected by at least one optical element in the light segmenting optics.

3. The system of claim 1, wherein the light source consists essentially of a bare LED and wherein the light segmenting optics do not include a light pipe.

4. The system of claim 1, wherein a vertical distance between the light source and target area is less than a horizontal distance between the light source and target area.

5. The system of claim 1, wherein the light segmenting optics comprise two or more reflective surfaces.

6. The system of claim 5, wherein at least one of the two or more reflective surfaces is curved.

7. An optical sensor assembly, comprising:
    a cover comprising an elevated portion having a top major surface and an opposed bottom major surface, wherein the top major surface includes a user interaction area with a common destination for light established therein;
    a light source mounted within a cavity defined by the cover, the light source being configured to emit light toward the common destination;
    light segmenting optics positioned between the light source and a common destination, the light segmenting optics comprising one or more optical elements configured to segment light emitted by the light source into at least a first light segment and a second light segment such that the first light segment travels a first optical path from the light source to the common destination and the second light segment travels a second optical path from the light source to the common destination, wherein the first and second optical paths are different, wherein the first light segment encounters at least one optical element in the light segmenting optics, and wherein the second light segment travels directly from the light source to the bottom major surface of the cover; and
    a substrate configured to have the light source mounted thereto; and
    a bracket mounted to the substrate, wherein the bracket comprises a first of the one or more optical elements.

8. The assembly of claim 7, wherein the light segmenting optics are at least one of integrated into the bracket and integrated into the cover.

9. The assembly of claim 7, wherein the bracket comprises a plastic material that has a reflective material applied to at least some portions thereof to create the first optical element.

10. The assembly of claim 7 wherein cover comprises a second of the one or more optical elements, wherein the cover comprises a plastic material that has a reflective material applied to at least some portions thereof to create the second optical element.

11. The assembly of claim 10, wherein the first light segment encounters both the first and second optical elements.

12. The assembly of claim 7, wherein the one or more optical elements are configured to segment light emitted by the light source into at least a first, second, and third light segment, wherein the third light segment travels a third optical path from the light source to the common destination, wherein the third optical path is different from the first and second optical paths, wherein the third light segment encounters at least one optical element in the light segmenting optics that the first light segment does not encounter, and wherein the first, second, and third light segments irradiate different portions of the common destination.

13. The assembly of claim 7, wherein the light source comprises a coherent light source.

14. A method of manipulating light emitted by a light source toward a target area in an Optical Finger Navigation (OFN) system, the method comprising:
    receiving light emitted by the light source at light segmenting optics;
    separating the light received at the light segmenting optics into a first and second light segment;
    enabling the first light segment to travel a first optical path on its way toward the target area;
    enabling the second light segment to travel a second optical path different from the first optical path on its way toward the target area; and
    causing the first and second light segments to irradiate different portions of the target area at substantially the same angle of incidence.

15. The method of claim 14, wherein the first optical path includes at least one optical element in the light segmenting optics that the second optical path does not include.

16. The method of claim 14, wherein the second optical path goes directly from the light source to the target area.

17. The method of claim 16, further comprising:
    reflecting the first light segment with the at least one optical element.

18. The method of claim 14, wherein the separating step further includes separating the light received at the light segmenting optics into a third light segment, the method further comprising:
    enabling the third light segment to travel a third optical path different from the first and second optical paths on its way toward the target area; and
    causing the third light segment to irradiate a portion of the target area not irradiated by the first and second portions, wherein the third optical path includes at least one optical element in the light segmenting optics that the first and second paths do not include.

* * * * *